United States Patent
Murray, III

(10) Patent No.: US 8,476,799 B2
(45) Date of Patent: Jul. 2, 2013

(54) PULSED MULTI-ROTOR CONSTANT AIR GAP MOTOR CLUSTER

(75) Inventor: James F. Murray, III, Bethany, OK (US)

(73) Assignee: Convergent, Power, Inc., Los Angeles, CA (US)

( * ) Notice: Subject to any disclaimer, the term of this patent is extended or adjusted under 35 U.S.C. 154(b) by 0 days.

(21) Appl. No.: 13/390,437

(22) PCT Filed: Aug. 12, 2010

(86) PCT No.: PCT/US2010/045298
§ 371 (c)(1),
(2), (4) Date: Feb. 14, 2012

(87) PCT Pub. No.: WO2011/019897
PCT Pub. Date: Feb. 17, 2011

(65) Prior Publication Data
US 2012/0139368 A1   Jun. 7, 2012

Related U.S. Application Data

(60) Provisional application No. 61/234,011, filed on Aug. 14, 2009.

(51) Int. Cl.
*H02K 7/20*       (2006.01)
(52) U.S. Cl.
USPC ......................................................... 310/112
(58) Field of Classification Search
USPC ........................................... 310/112, 83, 46
See application file for complete search history.

(56) References Cited

U.S. PATENT DOCUMENTS

| | | | | |
|---|---|---|---|---|
| 3,168,665 A | * | 2/1965 | Holper | 310/112 |
| 3,360,667 A | * | 12/1967 | Gordon, Jr. | 310/114 |
| 4,274,023 A | * | 6/1981 | Lamprey | 310/83 |
| 7,902,708 B2 | * | 3/2011 | Elmaleh | 310/156.43 |
| 2004/0080227 A1 | * | 4/2004 | Tung Kong et al. | 310/112 |
| 2005/0140230 A1 | | 6/2005 | Johnson et al. | |

FOREIGN PATENT DOCUMENTS

| | | |
|---|---|---|
| JP | 08-009602 A | 1/1996 |
| JP | 08-098479 A | 4/1996 |
| JP | 08-149766 A | 6/1996 |
| JP | 09-285081 A | 10/1997 |

OTHER PUBLICATIONS

International Search Report & Written Opinion issued in corresponding PCT Application No. PCT/US2010/045298 dated Mar. 3, 2011.

* cited by examiner

Primary Examiner — Nguyen N Hanh
(74) Attorney, Agent, or Firm — Parsons Behle & Latimer

(57) ABSTRACT

Electric motor cluster consisting of several stator sections each possessing a minimum of two salient pole projections, wound with power windings, and each section containing a single rotor. Each individual motor is angularly displaced one from the other, while mounted within a common housing, and geared together such that each motor section contributes to the rotation of a common output shaft. Each motor comprises at least one stator and one rotor section, such that each rotor section is associated with a specific stator section. The lateral axis of each rotor section is disposed at an oblique angle with respect to the axis of the shaft for that particular motor.

6 Claims, 5 Drawing Sheets

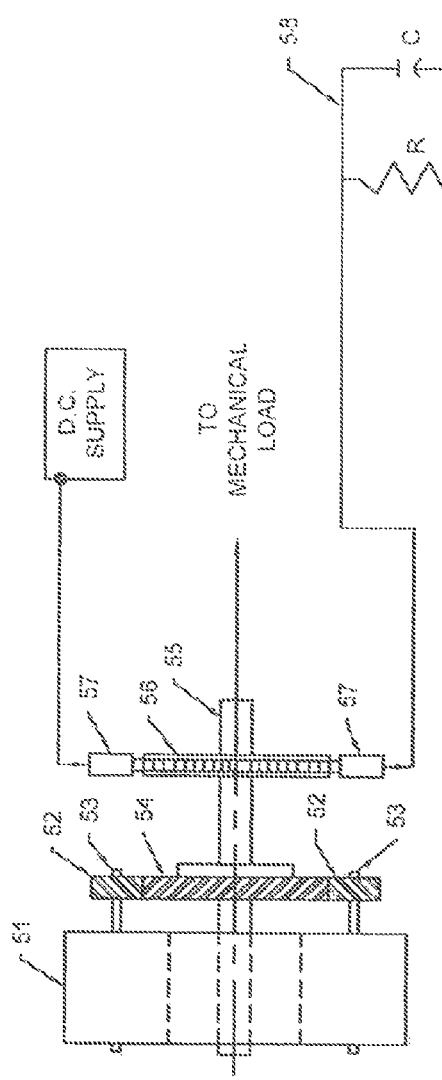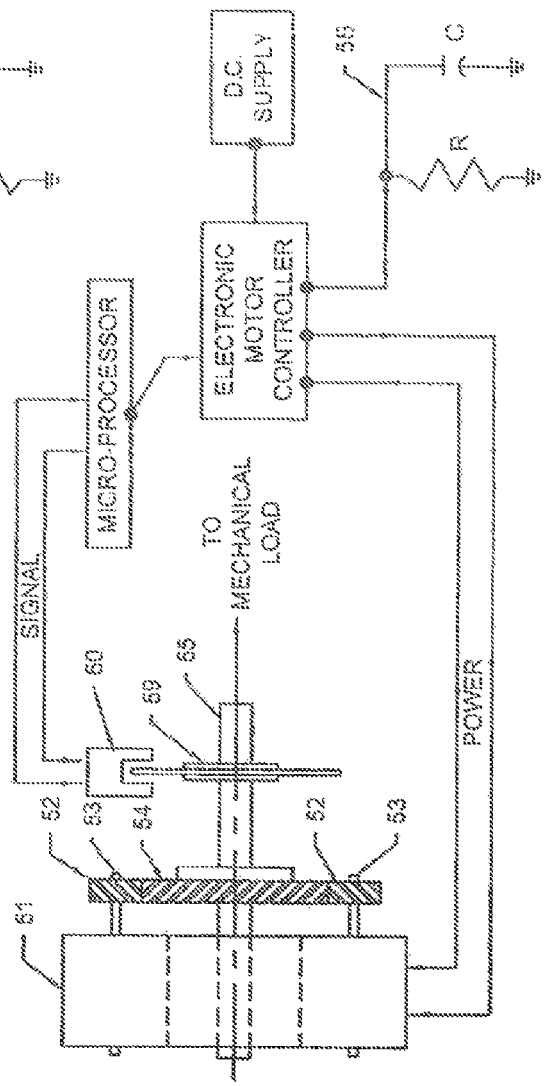

US 8,476,799 B2

PULSED MULTI-ROTOR CONSTANT AIR GAP MOTOR CLUSTER

FIELD OF THE INVENTION

This invention relates to the field of power conversion devices which transform electrical power into rotary mechanical power. The invention also relates to multiple motors having two or more motor sections, operating in parallel, each of which is comprised of a stator having two or more salient poles, and a rotor geometry devoid of coils or windings of any kind, affixed obliquely to a motor output shaft, and so disposed as to ensure a constant air gap between the rotor body and the salient poles of it's associated stator section.

The invention also relates to multiple motor sections with their associated armatures, mechanically positioned out of phase with one another, but mounted so as to allow the output pinions of each individual motor to impinge upon a common output gear of larger diameter, mounted upon a separate but common output shaft, such that each individual motor's output is combined mechanically, and afforded an amplification of torque.

BACKGROUND OF THE INVENTION

The basic concept employed in all prior motor art is the interaction between a current carrying conductor(s) and a magnetic field of some kind. This fact is true regardless of motor type. Said basic concept appears in DC Motors, single phase AC Motors, Poly Phase Induction Slip motors, which utilize a rotating magnetic field, and in Polyphase Synchronous Motors with externally excited electromagnetic cores, or permanent magnetic cores, as maybe the ease.

The only exception to this rule may be found in the design of stepper motors, which utilize a magnetic "ratcheting" action upon the magnetic material in the armature, in response to applied pulses of current. But, these devices do not have a constant and continuous air gap of fixed dimension between the rotor and the stator.

Therefore, it can be seen, that the prior art has not produced a multiple phase, multiply segmented stator with individual, obliquely disposed, laminated armatures devoted to each stator section, such that the stator/rotor combination employs a continuous air gap of constant dimension, regardless of the elliptical profile of said armatures, while not employing any current carrying conductors, coils, windings or bars within or upon the individual armatures, as a means of producing torque upon the output shaft.

Nor can it be said that the prior art has arranged such motors to cooperate in "parallel fashion," through a reduction gear arrangement so as to provide an amplification of torque while sharing the mechanical load.

A previous example exists, which makes use of the unique rotor design featured within this disclosure. Said rotor was introduced in the power conversion device entitled "Alternator Having Improved Efficiency," which was invented by James F. Murray III, filed as application Ser. No. 07/112,025, on Oct. 21, 1987, and later granted U.S. Pat. No. 4,780,632 on Oct. 25, 1988. All references cited herein are incorporated by reference.

There are marked differences between the present invention and "Alternator Having Improved Efficiency," they are listed as follows:

1.) Alternator of the original invention can be operated as a motor only when used in conjunction with the "Basic Motor Concepts" described above in this section, ie. requires field flux and current-carrying conductors.
2.) Alternator of the original invention does not require salient pole projections in order to operate.
3.) Alternator of the original invention makes use of an electromagnetic field winding, or a permanent magnet as its source of magnetic flux.
4.) Alternator of the original invention does not require two or more stator and armature sections in order to function.
5.) Alternator of the original invention does not require a shaft position indicator, or a commutator of any kind in order to function.
6.) Alternator of the original invention does not require a position sensitive, electronically controlled, pulsed power supply, in order to generate electricity.

Any other similarities between the original invention and the present invention are requirements possessed by any and all rotating power converters, such as bearings, shafts, end bells, laminations, mechanical housing, etc.

DESCRIPTION OF THE DRAWINGS

FIG. 5a is a diagram of a motor cluster having brushes and commutator for timing;
and
FIG. 5b is a diagram of a motor cluster having an optical encoder for timing.

DETAILED DESCRIPTION OF THE INVENTION

Figure 1:
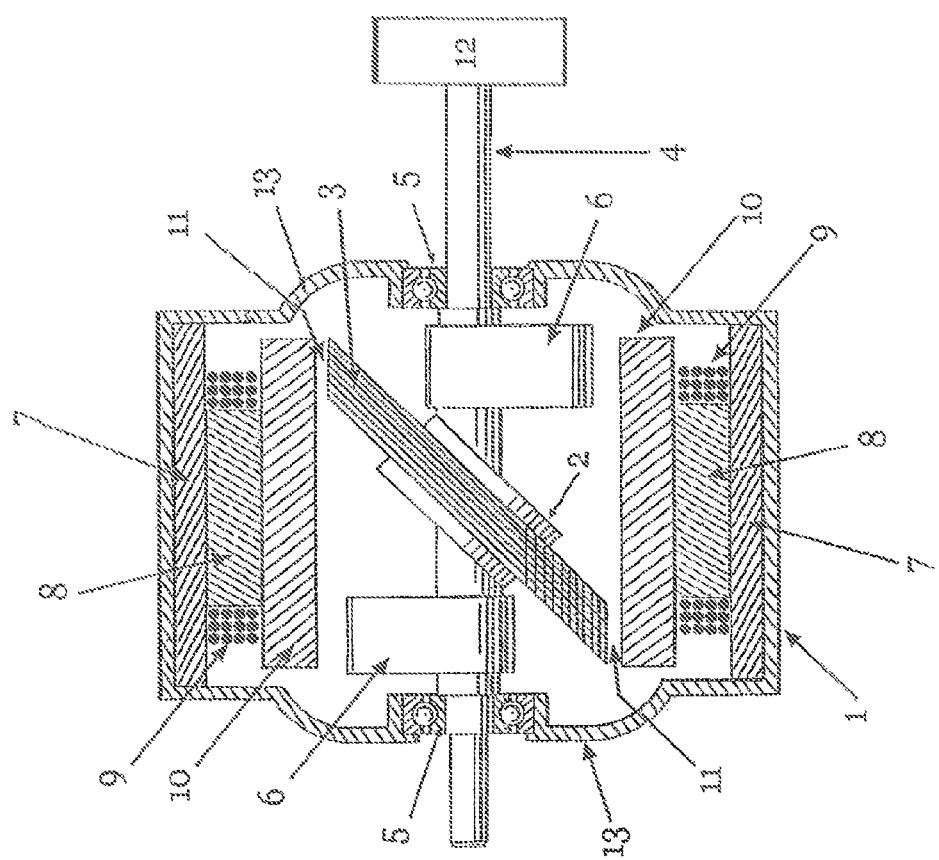
FIG. 1 is a diagram of a single-rotor with constant air-gap.

In an embodiment, an electric motor cluster consists of several stator sections each possessing a minimum of two salient pole projections, wound with power windings, and each having a single armature rotor. Each individual rotor is angularly displaced one from the other, while mounted upon a common frame, and geared together such that each motor section contributes to the rotation of a common output shaft.

Such an arrangement not only allows for the combining of motor output powers and the removal of flutter from the final mechanical output, but simultaneously allows for a large increase in output torque by virtue of the necessary reduction gearing. The embodiment suggested within this particular disclosure lends itself perfectly to applications within the field of electric vehicle propulsion, particularly in those cases where the prime mover is to be located within the wheels of the vehicle. However, other applications are easily envisioned.

Each motor section shall consist of stator and armature elements as described in PCT application number PCT/US09/46246, filed on Jun. 4, 2009, and entitled "PULSED MULTI-ROTOR CONSTANT AIR GAP RELUCTANCE MOTOR." Said motor shall consist of the following features:

A stator, consisting of a stack of laminations, or a molded ferrite core, so constructed as to provide at least one set of salient magnetic poles, spaced apart 180 mechanical degrees, and situated so as to allow an air gap to exist between said stator structure and the armature of the motor. Each salient magnetic pole projection shall be wound with power windings, the function of which shall be to produce a magnetic field of considerable strength, and direct same through the air gaps and into the body of the motor's armature.

An armature, also consisting of a stack of laminations, or a molded ferrite shape, so designed as to present each set of field poles with a cylindrical contour, perceived beyond each air gap, while retaining an elliptical profile with respect to the output shaft. Said armature sections carry no electrical windings of any kind, and require no slip rings or, field coils or permanent magnets. However, armature segments may require shaft-mounted counter weights to offset their eccentricity, and maintain angular balance during rotation.

The power windings wound upon the salient pole projections, are energized by pulses of electric current produced by a DC power supply and provided through an electronic controller unit, or through a mechanical commutator, etc. Said pulses are automatically applied to the salient pole nearest the longest flux path available through a particular rotor section, as determined by a shaft position sensor, or the geometry of a commutator.

The appearance of flux lines linking any stator pole set and any armature section, immediately causes a rotation of the motor's output shaft by 90 mechanical degrees as the flux lines seek to establish the shortest possible path available for the completion of their magnetic circuit within a given motor.

This action is transmitted to the main output shaft via a large reduction gear, thereby increasing the available torque. In the embodiment disclosed herein, several motor sections are positioned such that each may contribute to a common mechanical output. However, several such motor sections may be energized simultaneously, thereby increasing the output power in multiples.

Upon detecting motion, the shaft position sensor communicates the change in position of the output shaft to the electronic controller, and current flow is then terminated in each active stator section, and instantly initiated in the stator section windings next scheduled to be activated. By means of such switching action, which occurs at even intervals of mechanical degrees, a constant rotary motion is ensured.

FIGS. 1-5 illustrate a preferred embodiment of the motor cluster which constitutes the invention disclosed herein. Reviewing FIG. 1, it may he seen, that each motor section consists of a metallic housing 1 containing a stator stack 7 and an armature assembly 2, which is mounted upon an output shaft 4, which is carried by two sets of bearings 5, located within end bells 13.

The rotor assembly 2 within each motor section, consists of a stack of silicon steel laminations 3, or a molded ferrite of appropriate shape, or any other high permeability magnetic material designed to suppress eddy currents, machined so as to produce a section of a right circular cylinder canted at an angle of 45 degrees with respect to the motor output shaft 4. When viewed face on, the rotor structure appears to he circular in shape. However, the side view depicts an ellipse tilted at 45 degrees. This angle may not be the most optimal angle, and it should be realized that other angles may be employed without departing from the spirit of the invention.

Each motor shaft 4 may also carry counter weights 6, as depicted, which function to ensure a smooth rotary motion by suppressing mechanical vibrations produced by the mass distribution of the eccentric armature design 2. Each motor shaft carries a high speed output pinion 12 which is designed to mesh with the main output gear as shown in FIGS. 2 and 5.

Each stator assembly contains an individual stack of stator laminations 7 or a magnetic ferrite cylinder, from which extend two or more salient pole projections 8, each of which is wound with a power coil 9. The face of each pole projection 10 is extended to the right and the left of center to ensure continuous air gaps 11 of constant dimension. Said pole faces are always aligned parallel to the rotor's edge contour regardless of it's angular disposition. Those familiar with the art will realize that it may be possible to install more than two pole projections in association with each armature without departing from the spirit of this invention.

Figure 2:
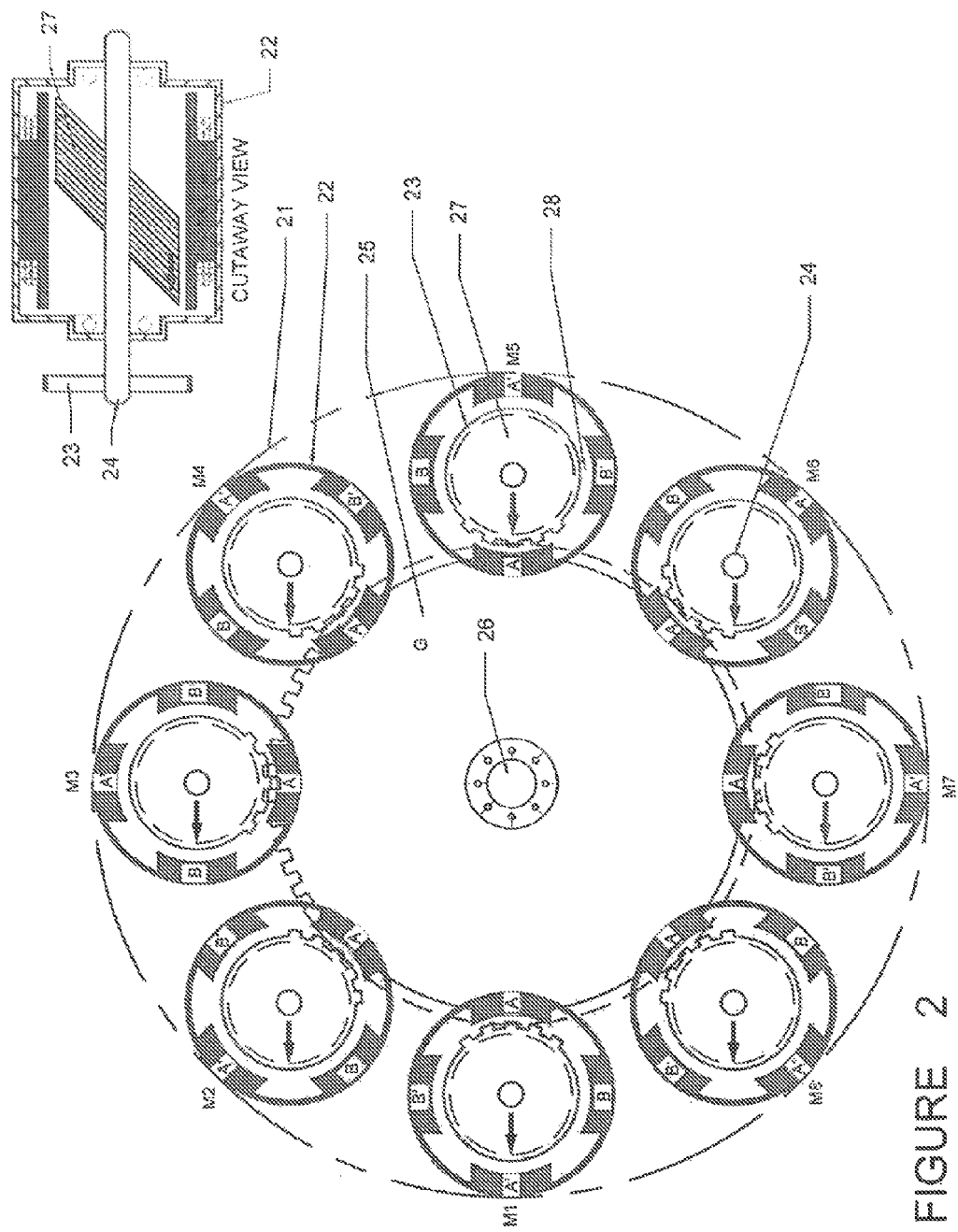
FIG. 2 is a diagram of a parallel output cluster of motor sections such as the one shown in FIG. 1.

Referring now to FIG. 2, the concept of the parallel motor cluster will become apparent in greater detail. The embodiment depicted makes use of eight individual motor elements numbered clockwise, M1 through M8, starting at the 9:00 o'clock position. The motor elements are mounted at 45 degree intervals upon a circular frame 21. Each motor element consists of a laminated, four pole stator stack 22, an air gap 28, an elliptical rotor 27, an individual motor output shaft 24, and an output pinion 23. Further, it will he noted, that each output pinion is in mesh with a central output gear or "bull gear" 25 which drives the main output shaft 26.

Figure 3:
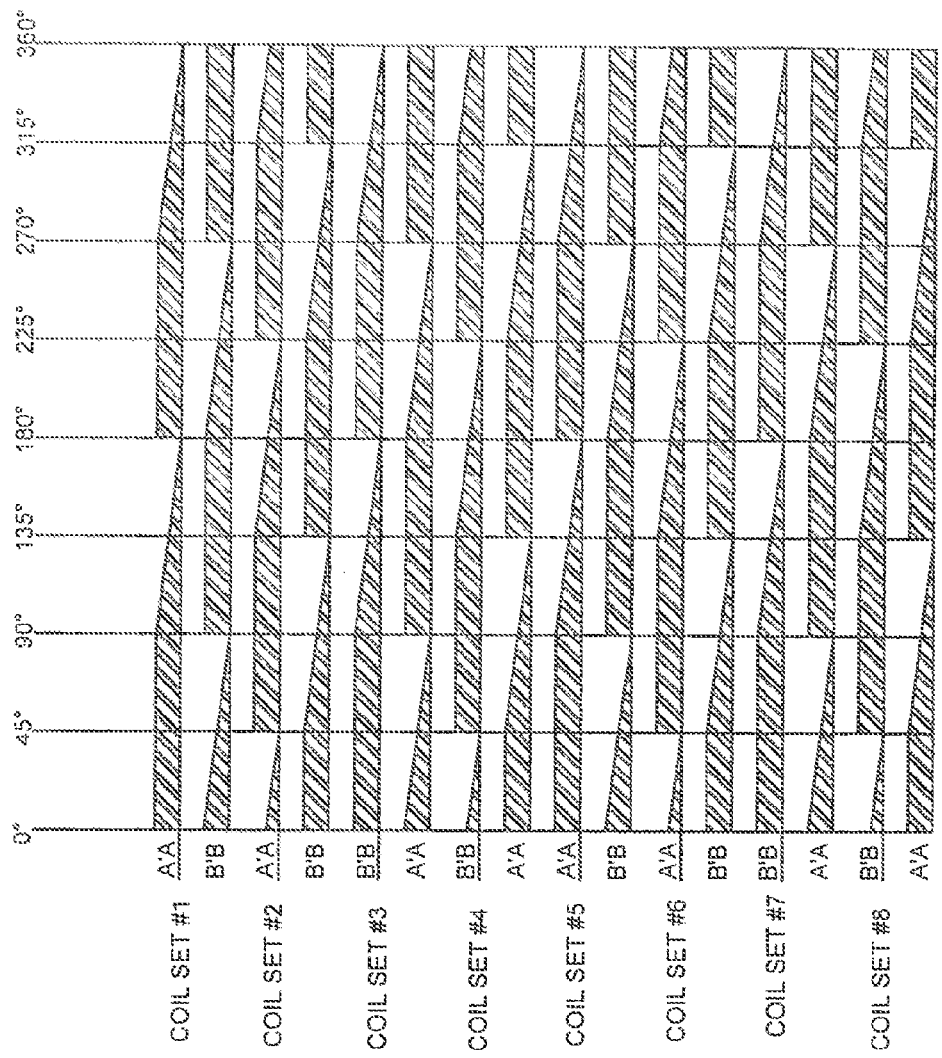
FIG. 3 is a motor coil energizing scheme for the motors of FIG. 2.

This arrangement allows for four motors to be energized at any one time, with power overlaps and torque-sharing occurring at 45 degree intervals. This feature serves to smooth out the total torque delivered to the output shaft, allowing for a more continuous delivery of power, as each contributing motor develops it's output torque out of phase with respect to each of the others. Total motor action during operation may be appreciated by studying the coil energizing truth table depicted in FIG. 3, while the power coil interconnection schematic may be reviewed in FIG. 4. In FIG. 3, the horizontal portions of each chart depict energized coils and the sloped portions of the chart represent the magnetic reset of the energized coils. There are shown coil sets for eight motors as described in the above text with respect to FIG. 2.

Figure 4:
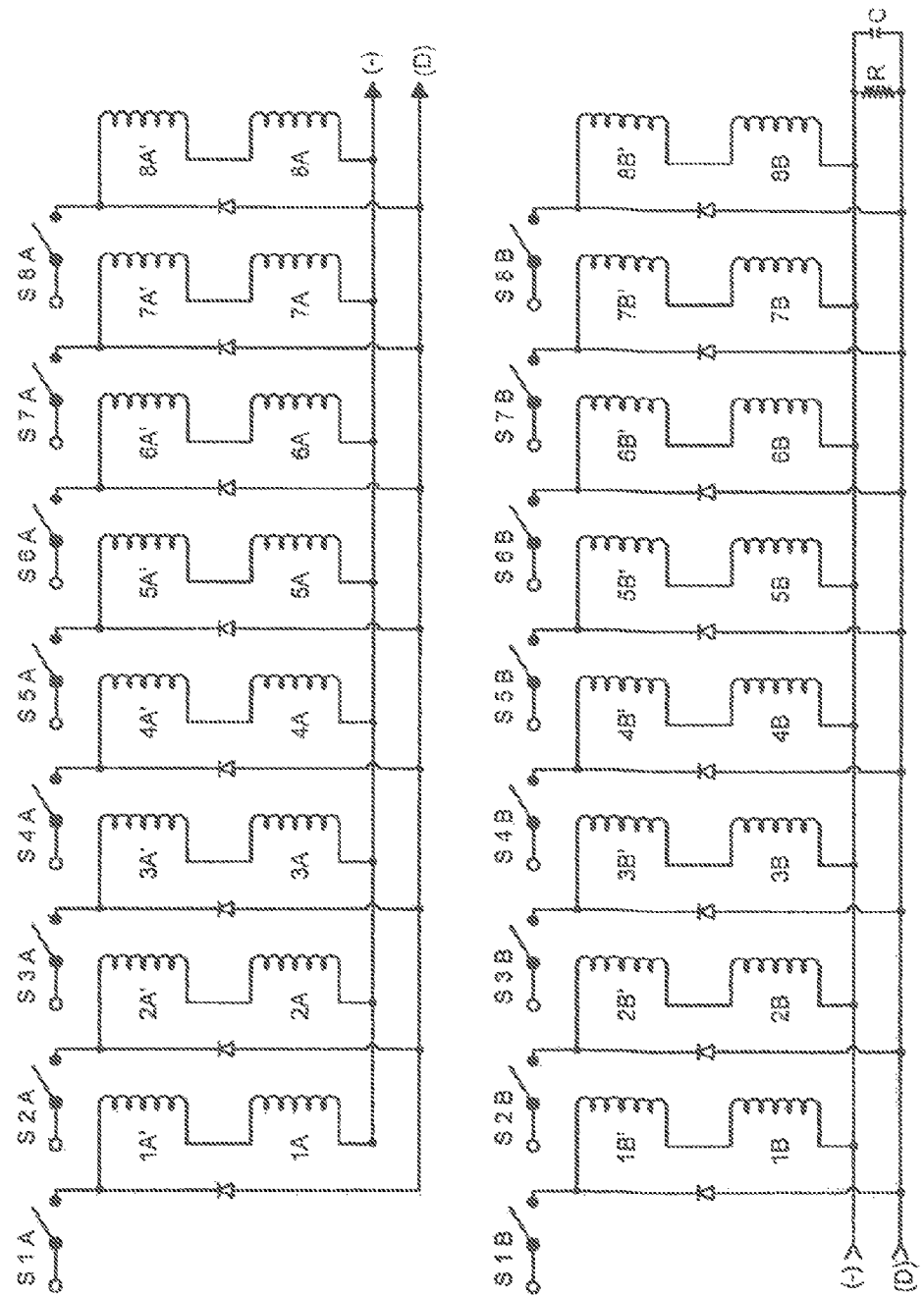
FIG. 4 is a schematic of coil interconnections for eight motor sections mechanically connected in parallel.

Referring now, to FIG. 4, it will be noted that switches S1A through S8A, and switches S1B through S8B, are used to control the power winding coil sets in each motor section. The coil sets are labeled A, A' and B, B' for each motor as shown in FIG. 2. These switches are schematically accurate, but may represent either solid state switching devices located within the electronic motor controller, or actual contact bars located upon a more traditional commutating device. These distinctions are more clearly explained in FIG. 5.

FIGS. 5A and 5B depict two variations of the present invention. FIG. 5A demonstrates the parallel motor cluster concept employing a traditional electro-mechanical commutating device 56, 57, while FIG. 5B demonstrates a more modern approach employing a shaft-mounted encoder 59, a micro-processor, and an electronic motor controller. It will be noted, that both systems require a source of DC power, as well as a capacitive power sump, into which excess "inductive energy" is directed. This "sump" may be equipped with a resistive load, which will consume said inductive energy, or the accumulated potential may be utilized to supply other worthwhile power requirements.

Returning now to FIGS. 5A and 5B, it will be noticed that each arrangement contains a motor cluster housing 51, a plurality of high speed motor pinions 52 mounted upon individual motor output shafts 53, and a central bull gear 54 mounted upon a main output shaft 55. However, FIG. 5A makes use of a mechanical commutation device 56 with standard carbon brush contactors 57, while the device shown in FIG. 5B employs a shaft encoder 59 and an encoder pick-up device 60.

Observing FIG. 5B, it will be noted that electronic signals obtained from the encoder assembly are transmitted to the micro-processor and the electronic motor controller, while power pulses are independently directed to individual motor windings via output conductors energized by the motor controller. Alternatively, the arrangement shown in FIG. 5A accomplishes these functions electro-mechanically, which may be advantageous in situations requiring the control of electric power greater than can be managed by present day solid state switching devices. Ultimately, however, both systems produce the results depicted in FIG. 3, and both systems ultimately direct inductive energies from collapsing magnetic fields into the capacitive sump indicated by network 58.

It should he understood that the embodiment discussed in this application and depicted in associated FIGS. 1 through 5, are for illustrative purposes only, and that those having skill in the electrical arts will understand that modifications and alterations can be made hereto, within the sprit of the present invention.

The invention claimed is:

1. A motor cluster comprising:
    a plurality of constant air gap reluctance motor sections, each having a rotor and a stator, and each motor section driving a single output shaft;
    an output shaft position transducer; and
    a motor controller,
    wherein said motors are physically connected to said single output shaft such that the angular relationship between the rotor and stator of a first of said motor section is different than the angular relationship between the rotor and stator of a second of said motors; and wherein said motor controller applies electrical power to said stators to rotate said rotors and said single output shaft via a reduction gear assembly.

2. The motor cluster of claim 1, wherein said output shaft comprises a bull gear and each of said plurality of said motors is connected to said bull gear with a pinion gear.

3. The motor duster of claim 1, wherein the application of electrical power to said stators is staggered from one motor to the next.

4. The motor cluster of claim 1, wherein each motor comprises:
    a stator, having stator poles and stator windings and
    a rotor having a flux path element, said flux path element being attached to a rotor shaft at an oblique angle to the longitudinal axis of said shaft and having a shape that provides a uniform air gap with said stator poles when said shaft is rotated.

5. The motor cluster of claim 4, wherein said flux path elements comprise a ferrous lamination stack or a solid ferrite elliptical plate.

6. The motor cluster of claim 4, wherein said stator poles are positioned in pole pairs with said rotor and rotor shaft between them thus forming separate magnetic field circuits within the stator when said stator windings are supplied with electrical current, such that a magnetic field is established having a single magnetic polarity in each of said poles of said pole pairs, with said each pole of said pole pairs having oppsite magnetic polarity.

* * * * *